Jan. 22, 1963   H. S. BLOCH   3,074,391
CONTROL OF AUTOMOTIVE EXHAUST GASES
Filed Nov. 29, 1961   2 Sheets-Sheet 1
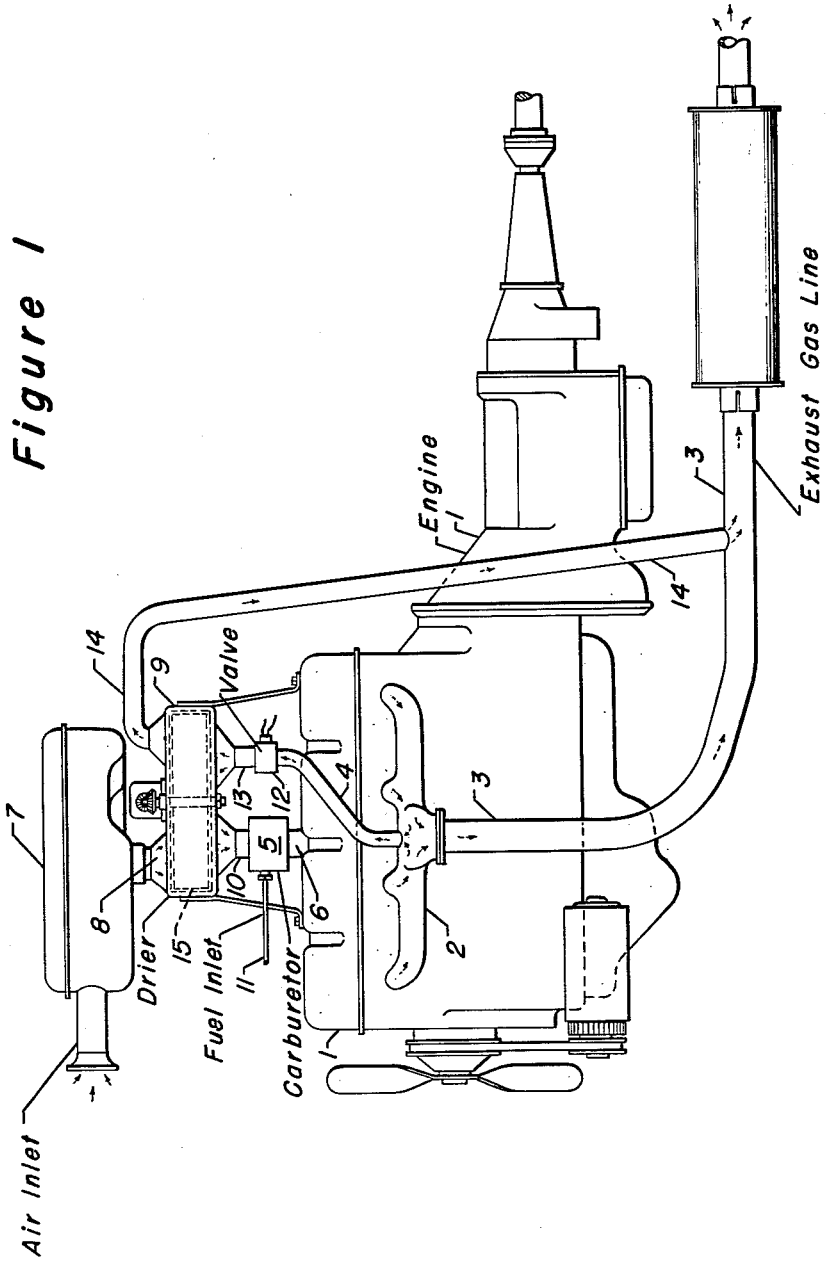
INVENTOR:
Herman S. Bloch
BY: Chester J. Giuliani
Philip T. Liggett
ATTORNEYS Jan. 22, 1963 H. S. BLOCH 3,074,391
CONTROL OF AUTOMOTIVE EXHAUST GASES
Filed Nov. 29, 1961 2 Sheets-Sheet 2
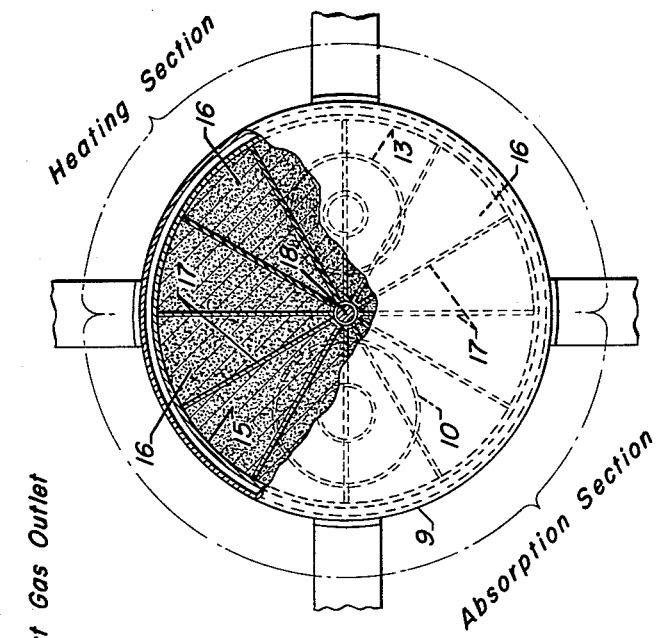
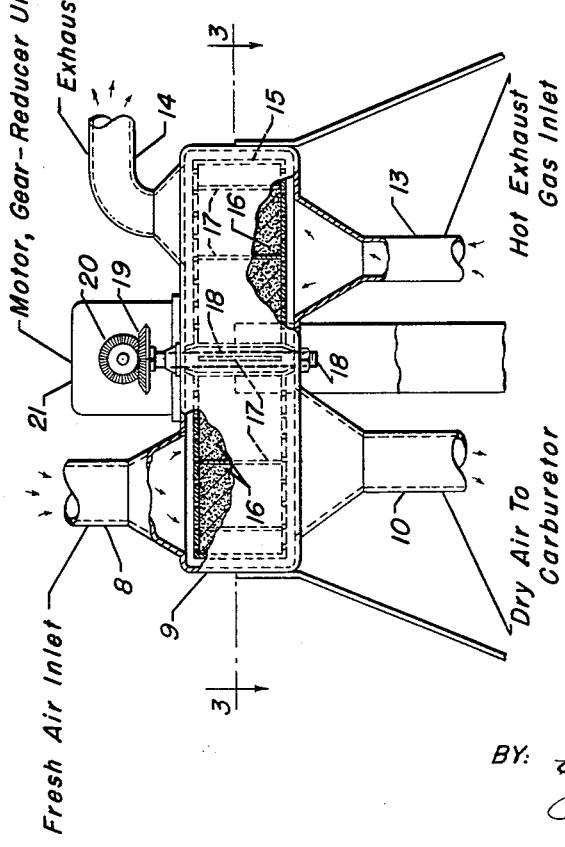
INVENTOR:
Herman S. Bloch
BY: Chester J. Giuliani
Philip J. Liggett
ATTORNEYS

United States Patent Office 3,074,391
Patented Jan. 22, 1963

3,074,391
CONTROL OF AUTOMOTIVE EXHAUST GASES
Herman S. Bloch, Skokie, Ill., assignor to Universal Oil Products Company, Des Plaines, Ill., a corporation of Delaware
Filed Nov. 29, 1961, Ser. No. 155,548
10 Claims. (Cl. 123—122)

The present invention relates to a method for controlling automotive exhaust gases to prevent air pollution, and more particularly to the reduction of carbon monoxide and hydrocarbons in auto exhaust gas streams by drying the initial air to the engine.

The desirability and importance of removing certain components from automobile exhaust gases has recently been generally well established. The unavoidably incomplete combustion of hydrocarbon fuels by the gasoline engine results in the generation of substantial quantities of unburned hydrocarbons and other undesirable products, which, as waste products, discharge into the atmosphere through the exhaust line. With the ever-increasing concentration of automobiles, particularly in urban areas, the discharge of the deleterious matter into the atmosphere may reach significant proportions. These undesirable products are believed to react with atmospheric oxygen, under the influence of sunlight, to produce what is now commonly referred to as smog. The undesirable hydrocarbonaceous combustion products include, for example, unsaturated hydrocarbons, partially oxidized hydrocarbons, such as alcohols, ketones, aldehydes, and acids, etc., carbon monoxide and various oxides of nitrogen and sulfur.

The discharge of exhaust gases from automotive engines is only one source of pollution within the atmosphere. Although described with particular reference to the control of such exhaust gases, the present invention is equally well-adaptable to utilization with diesel engines, butane engines, natural gas engines, and the like. Other examples of the discharge of deleterious waste products into the atmosphere include the waste material from stationary units such as large internal combustion engines for driving pumps, compressors and generators, and flue-gas power recovery units, etc.

The present invention provides for drying and regulating the specific humidity, or water content, of air drawn into an engine and thus reducing the oxidizable components in the exhaust gas stream without necessarily having to utilize an afterburner type of apparatus or a catalytic converter to treat such exhaust gases. It is, of course, possible to utilize the present operation in combination with an exhaust gas treating apparatus, however, it is believed that by effecting efficient drying of the air intake stream it is possible to obviate the need of after-burning types of apparatus. A suggested standard for controlling the smog problem has set, as upper limits for exhaust streams, the presence of not more than 275 parts per million of hydrocarbons and 1.5% carbon monoxide, by volume. Such limits may be held for the most part by the present invention providing suitable air intake regulation and control of entrained water content.

To illustrate the effect of water content on exhaust emanations, the following table sets forth test data from two different stationary engines for twelve different periods of time, together with data showing water content in the air being drawn into such engines for such periods. For purposes of easily comparing the acquired data, the engine emanations are shown as averages for the given periods, in parts per million (p.p.m.) of hydrocarbon emission (as read from a Liston-Becker Infra-Red Detector sensitized with an acetylene-benzene-ethylene (ABE) cell) with the term "hydrocarbon" connoting all hydrocarbons, whether saturated, unsaturated, or partially oxidized as so determined. The water content in the air is the average for the stated period, being given in grains per cubic foot of air.

| Time Period of Operation | Average Hydrocarbon Emissions, (p.p.m.) | | Average Water Content of Intake-Air (Grains/cu. ft.) |
|---|---|---|---|
| | General Electric Engine | Midwest Engine | |
| 1 | 375 | | 5.53 |
| 2 | 220 | | 3.32 |
| 3 | 260 | | 2.33 |
| 4 | | 300 | 1.23 |
| 5 | | 190 | 1.12 |
| 6 | | 200 | 1.75 |
| 7 | | 235 | 2.05 |
| 8 | 260 | 265 | 2.26 |
| 9 | 375 | 260 | 2.62 |
| 10 | 460 | 300 | 4.81 |
| 11 | 455 | 395 | 5.80 |
| 12 | 470 | 355 | 6.06 |

Upon referring to the foregoing table, it will be noted that, other than for the General Electric engine operation for period number 9, the average emanations of unoxidized hydrocarbons were 300, or less than 300 p.p.m., for water content ranging from about 1.12 to 3.32 grains per cubic foot of air.

Also, it may be noted in the case of the Midwest Engine operation that only 300 p.p.m. of hydrocarbons were measured as the average emission for the number 10 period of operation, during which period the average water content of the engine intake air was 4.81 grains per cubic foot of air, so that for some engine operations it appears a water content of about 4.5 grains will still provide an allowable emission of only about 275 parts per million of hydrocarbons.

Thus, it is a principal object of the present invention to obtain a substantial reduction in hydrocarbon content in an engine exhaust gas stream by effecting the drying of intake-air into the engine.

Where hydrocarbon emissions are to be held to a low level, then the drying operation on the intake-air must be carried to hold water content to less than about 3.5 to 5 grains per cubic foot of air, or alternatively to less than about 8 mm. of partial pressure of water vapor. On the other hand, where the emissions can be permitted to be greater than 275 p.p.m. of hydrocarbons, then water content can be greater and perhaps up to about 12 mm. partial pressure of water vapor.

Various methods may be utilized to effect the drying of air which is passed into an engine, such as, for example, by the use of a refrigerator type of coil in a dehumidifying apparatus. In the case of a stationary engine, suitable power operated dehumidifying apparatus may be used to effect the drying of engine intake-air to provide the desired low water content. On the other hand, in the case of a moving vehicle it would be necessary to have the compressor for the dehumidification section powered by the automotive engine itself. It is also recognized that to obtain adequate reduction in water content for the intake-air to a high horsepower automotive engine, a relatively large dehumidifying unit would be necessary, so that drying means other than of the refrigeration coil type may be preferable.

Other means providing for the dehumidification of the engine intake air may make use of suitable solid desiccants such as alumina, silica gel, zeolitic alumino-silicates of the molecular sieve types, or water absorbing liquids such as glycerine, the glycols, and the like. Deliquescent solids or chemical absorbents, such as calcium chloride or potassium hydroxide, may be used but are less practical.

Broadly, the present invention provides for controlling unoxidized components in the exhaust from an internal combustion engine to a low level, which comprises, drying the air stream being drawn into the engine so as to have less than about 12 mm. of partial pressure of water vapor in said air stream.

One preferred arrangement makes use of a particulated desiccant material with means being provided for periodically or continuously heating and drying a contacted and wet portion of the desiccant so that it may be reused for the drying of the intake-air to the engine. Also, the drying and heating operation in connection with an automotive type of engine may have a heat exchange arrangement which utilizes hot exhaust gases from the engine itself to drive off the adsorbed water in the wet desiccant material.

In a more specific embodiment, the present invention provides a continuous method for reducing and controlling the quantity of unoxidized components being discharged with an engine exhaust stream, which comprises, passing the air being drawn into the engine into contact with a portion of a substantially dry desiccant material maintained within a confined zone, and thereby drying such air, simultaneously passing at least a portion of hot exhaust gases from said engine into heat exchange with a portion of contacted wet desiccant material which has been used to contact air being drawn into said engine and effecting the heating and removal of water from such desiccant material, and effecting at least periodic exchanges of resulting dried desiccant material for air contacted wet desiccant material, whereby to maintain a reduced water intake with said air being drawn into said engine.

Various apparatus arrangements may be utilized to accomplish the desired engine intake-air drying operation, as well as various desiccant materials, as aforesaid. However, a desirable continuously operating embodiment provides means for mechanically shifting a "dried" portion of the desiccant into a predetermined position or zone to replace wet desiccant. The term "wet" desiccant as used in the present application refers to a material, which may be in either particle or liquid from, that has adsorbed water from a contacted stream. On the other hand, the term "dried" desiccant as used herein refers to a material which has been either predried or heated and regenerated to drive off the major portion of the adsorbed water content.

Reference to the accompanying drawing and the following description thereof will serve to illustrate one method of continuous operation to reduce the water content of the engine intake-air whereby to in turn reduce the emanation of undesired unburned components from such engine.

FIGURE 1 of the drawing is a diagrammatic elevational view indicating the use of a water drying unit for treating the intake-air to an engine.

FIGURE 2 of the drawing is an enlarged view of the drying unit, shown partially in section, and indicating the use of a particulated desiccant material to dry the engine intake-air, as well as a heat exchange arrangement to use exhaust gases to dry the wet portion of the desiccant.

FIGURE 3 of the drawing is a partial sectional plan view through the desiccant bed of the drying unit, as indicated by the line 3—3 in FIGURE 2.

Referring now to FIGURE 1 of the drawing there is dicated an engine 1 having an exhaust manifold 2 which in turn connects with exhaust outlet pipe 3 and a by-pass line 4. The carburetor 5 connects through a gas-air vapor inlet line 6 to the intake manifold of the engine (not shown in the drawing) so that fuel may be continuously supplied for engine operation. The air to the carburetor is first drawn through a suitable filter 7 and line 8 connective with a drying unit 9. The latter in turn discharges substantially dry intake air through line 10 to the carburetor 5. The fuel inlet line to the latter is indicated by line 11.

In accordance with the present invention, suitable drying means, such as may be provided by a desiccant material, is used to treat the intake-air to the carburetor of an engine such that the water content is preferably below about 5 grains per cubic foot (or below about 12 mm. of partial pressure). The removal of the entrained water content in the air stream may be accomplished by using a suitable depth of particulated desiccant and by periodically or continuously substituting dry desiccant material for that which has become wetted. As is better shown in FIGURE 2, means may be provided for continuously rotating a cylindrically shaped bed of desiccant material within the drier unit 9 so that portions of the wet desiccant may be heated and in effect regenerated by driving off the water content, to permit the continuous reuse of the desiccant in the drying portion of the unit 9. FIGURE 1 of the drawing indicates diagrammatically the use of a portion of hot exhaust gases passing through line 4 and valve 12 into line 13 which in turn communicates with a regenerating or heating zone of the drier unit 9. Valve 12 may be a remotely controlled, electrically operated type, such that the heat exchange arrangement may be automatically cut in and out. An outlet line 14 from the drying unit 9 is provided to carry off the used exhaust gas stream and entrained water vapor. Line 14 is shown connecting with the exhaust outlet line 3, which in turn may discharge to the atmosphere or if desired, to additional gas treating equipment which may comprise an afterburner or catalytic converter to effect the oxidation of remaining entrained oxidizable components which contribute to the contamination of the atmosphere.

In FIGURES 2 and 3 of the drawing, there are shown diagrammatically, but in more detail, means for providing a drier unit 9 such that it may be operated in a continuous manner to effect the drying of the fresh air inlet to the carburetor in one section, and the removal of absorbed water from the desiccant within another section of the housing. Thus, within the drier housing 9, there is indicated a rotatable cylindrically-shaped chamber 15 having the upper and lower faces perforated to permit the passage of gases substantially vertically therethrough. The perforations in the faces shall, of course, be correlated to the size of the particulated material 16 being used as a desiccant such that the particles are readily retained within the unit while being subjected to the vertically flowing gas streams. In accordance with the diagrammatic drawing of FIGURE 1, air inlet line 8 connects to the top of the drying section of the unit, while a dried air outlet port at the lower face connects with line 10 for passing substantially dried air to the carburetor or air intake portion of the engine. On an opposing portion of the drying unit 9 there is indicated a heating section which has a lower hot gas inlet from line 13 and an upper exhaust gas outlet connecting with line 14. The desiccant in the inner chamber 15 is retained within a plurality of small sections or compartments provided in turn by a plurality of spaced radially positioned partitions 17. The latter are preferably of a non-perforate construction and extend continuously between the upper and lower faces of the unit 15 so as to preclude lateral flow of gases from one section to another.

An axially positioned pin or shaft 18 is connected with the rotatable chamber 15 and extends upwardly and downwardly therefrom through suitable openings or bearing means in the outer housing of the drier unit 9 such that the unit 15 may readily rotate 360° internally within the drying unit. Various types of power supply means may be used and various forms of linkage means to the shaft. In the present embodiment there is indicated diagrammatically at the top end of the shaft 18, the connection of a bevel gear means 19 which in turn engages with a bevel gear 20 at the end of a power driven shaft from a motor gear reducer unit 21. The gear reducer unit 21 may be suitably powered by a battery or by a belt arrangement from the engine itself. Actually, a relatively small motor and gear reducing arrangement may be provided to connect with the rotating chamber 15 so that there is in turn a relatively low rate of rotation for the latter to move the desiccant continuously between the absorption and heating sections. If desired, means not shown may be used to start and stop the motor-unit 21 and the rotating chamber 15 independently of the engine operation. For instance, it may be advisable to disengage the rotating operation during engine startup periods.

In the continuous operation of the unit, the partitions 17 within the desiccant bed 16 serve to preclude cross mixing of the intake-air stream with the exhaust gas stream. In other words, the fresh air stream passing downwardly from inlet line 8 to outlet line 10 will continuously be distributed downwardly through that portion of the desiccant bed 16 which, at any one time, is directly below inlet port from line 8 and above outlet port to line 10, while at the same time the hot exhaust gas stream flowing upwardly from line 13 into bed 16 will be continuously discharged through outlet port to line 14 and thence into the exhaust gas line 3. The small amount of air which may be entrained with the bed 16 during the rotating movement of chamber 15 and carried over into the regenerating or heating section to be discharged with the exhaust gas stream will cause no harm in the operation of the unit. Similarly where there is some carry-over of a portion of the exhaust gas stream into the air intake and absorption section of the unit, there will be no detrimental effect, inasmuch as such small quantity of gas stream after passing through the desiccant will be harmless in the over-all engine operation.

As hereinbefore pointed out, various types of desiccants may be utilized within the scope of the present invention to reduce water content of the air and it is not intended to limit the operation of the unit to the use of any one material. The diagrammatic embodiment shown is, of course, adapted to utilize a particulate material such as alumina, silica gel, etc., whereby long periods of operation may be obtained without having to change the material in the bed 16. Various means may also be provided for housing the desiccant and effecting the mechanical substitution of a dried portion of the desiccant for a contacted or wetted portion, however, it is a desirable feature of the present invention to provide means in a manner similar to that set forth to use at least a portion of the waste exhaust gas stream as a heating medium to pass in heat exchange relationship with the desiccant material such that the latter is dried and made ready for reuse. Indirect heat exchange means may be used in the heating or regenerating section, where desirable, in lieu of the direct contact heat exchange arrangement provided in the illustrated embodiment.

The quantity of particulated desiccant in a particular unit will vary in accordance with adsorption characteristics of the desiccant to be used as well as upon the humidity and volume of the air to be dried to a given low water content level. The volume, or quantity, of air to be treated will in turn vary with the engine size and speed of operation.

In an illustrative example, assume the use of a silica gel bed as the desiccant to treat 90.6° F. air having wet bulb temperature of 88.6° F. (i.e. by Psychrometric Chart readings, air having approximately 92% relative humidity or about 33.9 mm. of mercury of partial pressure, which in turn is equivalent to about 14.1 grains of water per cubic foot of air). For drying such air there will be "spent" approximately 28 cubic inches of silica gel per minute in the drying zone to dehydrate about 40 cubic feet of the 90.6° F., and 92% relative humidity air per minute and effect a reduction in water content to about 4 grains per cubic foot, assuming use of the gel to 60% of its capacity. The 40 cubic feet per minute figure is based on an average engine requirement of about 2400 cubic feet of air per hour. To provide a continuous operation of intake-air drying, the volume of the cylindrically shaped desiccant bed in the drying unit of an apparatus, such as illustrated in the drawings, shall be at least double the calculated quantity or 56 cu. in., so that a wet portion may be continuously rotated into a heating zone and a dried portion continuously moved into the absorption or drying zone. The foregoing volume of desiccant to handle 40 cubic feet per minute in the air drying zone is based upon a rate of rotation such that there is at least 180° of rotation to the cylindrical bed per minute of operation. This rate of rotation will thus permit an entire change of bed in the treating zone for each one minute period. If the bed rotates more slowly, correspondingly more total desiccant is required. For example, if the rotation rate is 120° per minute, 84 cu. in. of silica gel are needed; at 90° per minute, 112 cu. in.; etc.

I claim as my invention:

1. A method for controlling the quantity of unburned oxidizable components being discharged with an engine exhaust stream which comprises, drying the air stream being drawn into said engine to less than about 12 millimeters of partial pressure of water vapor in said air stream.

2. A method for reducing the quantity of unburned oxidizable components being discharged with an engine exhaust stream which comprises, passing the air being drawn into said engine into contact with a desiccant material and reducing the water content thereof to less than about 8 millimeters of partial pressure of water vapor in said air stream.

3. A method for controlling the quantity of unburned oxidizable components being discharged with an engine exhaust stream which comprises, drying the air being drawn into the engine to reduce the water content thereof to less than 12 millimeters of partial pressure by contacting such air with a portion of a substantially dry desiccant material within a confined drying zone, passing at least a portion of the engine exhaust gas stream from the engine into heat exchange relationship with a portion of wet desiccant which has been subjected to contact with said air stream being drawn into said engine and heating and removing water from said desiccant, and effecting at least periodic exchanges of resulting substantially dry desiccant for wet desiccant whereby to maintain a reduced water content in the air stream being drawn into said engine.

4. A method for reducing the quantity of unburned oxidizable components being discharged with an exhaust stream which comprises, passing the air being drawn into the engine into contact with a particulated desiccant material and reducing the water content of said stream to less than about 8 millimeters of partial pressure of water vapor in said stream, periodically moving at least a portion of the resulting contacted wet desiccant material into a heating zone and passing at least a portion of the engine exhaust gas stream into heat exchanging relationship therewith, effecting the heating and removal of water content from said contacted wet desiccant and periodically exchanging resulting substantially dry desiccant material for said wet desiccant material in the drying zone whereby to maintain a reduced water content in the air stream passing into said engine.

5. The method of claim 4 further characterized in that said desiccant material is a particulated solid material which may be maintained within a confined perforate zone, whereby a gaseous stream may be passed through said zone to effect a contact with such material.

6. In combination with an internal combustion engine, apparatus for reducing the water content in the intake-air to the engine to in turn reduce the quantity of unburned components in an exhaust gas stream therefrom, which comprises in combination, maintaining a desiccant material within a confined housing in an air stream pathway therethrough, said housing having fresh air inlet means thereto and dried air outlet means therefrom for passing air into contact with said material, and said housing being positioned upstream from the air intake for said engine with conduit means connecting the latter with the dried air outlet from said housing for conducting contacted dried air into said engine.

7. The apparatus of claim 6 further characterized in that said desiccant material is removably maintained within said housing whereby resulting contacted wet desiccant material may be periodically removed and replaced with a dry desiccant material.

8. In combination with an internal combustion engine, apparatus for reducing the water content in the intake-air stream to such engine to in turn reduce the quantity of unburned components in the exhaust gas stream therefrom, which comprises in combination, a particulated desiccant material maintained within a rotatable cylindrically shaped perforate container, said container being in turn maintained within a housing having separate pairs of inlet and outlet means, one pair thereof serving to pass an inlet air stream through one portion of said housing and a portion of said desiccant material and to discharge dried air therefrom, while the second pair of inlet and outlet means serves to channel a hot exhaust gas stream through a heating portion of said housing and a separate portion of said material, conduit means connecting the dried air outlet means from said housing to the air-intake means for said engine, a hot gas conduit connecting between the hot gas inlet means on said housing and the exhaust gas line from said engine whereby to pass a hot gas stream to said heating portion of said housing and into contact with such portion of said desiccant material therein, supporting shaft means rotatively holding said perforate container within said housing, at least one end of said shaft means extending through the housing to connect through linkage means with a power supply means, said power supply means providing through said linkage means for the rotation of said container within said housing at a predetermined controlled rate of rotation whereby said desiccant material may be rotated within said housing and all portions thereof alternately contact intake-air being drawn into said engine and hot exhaust gases being discharged from said engine.

9. The apparatus of claim 8 further characterized in that said perforate container for said desiccant material has a plurality of spaced radial non-perforate partitioning members to provide for holding said desiccant material in a plurality of separate adjacent sections therein.

10. The apparatus of claim 8 further characterized in that said power supply means is a motor gear-reducer unit positioned to engage one end of said shaft extending through said container and said housing whereby the rate of rotation of said container in said housing may be regulated at a controlled rate.

No references cited.